United States Patent [19]

Pfeiffer et al.

[11] Patent Number: 4,672,656
[45] Date of Patent: Jun. 9, 1987

[54] METHOD FOR ESTABLISHING A RADIO CONNECTION

[75] Inventors: Theodor Pfeiffer, Fellbach; Josef Sperlich, Backnang, both of Fed. Rep. of Germany

[73] Assignee: ANT Nachrichtentechnik GmbH, Backnang, Fed. Rep. of Germany

[21] Appl. No.: 660,482

[22] Filed: Oct. 11, 1984

[30] Foreign Application Priority Data

Oct. 15, 1983 [EP] European Pat. Off. ......... 83110314.8

[51] Int. Cl.⁴ .............................................. H04Q 7/01
[52] U.S. Cl. ....................................... 379/58; 455/12; 379/57
[58] Field of Search ................. 179/2 E, 2 EA, 2 EB, 179/2 EC; 455/12, 13; 340/825.44, 825.47

[56] References Cited

U.S. PATENT DOCUMENTS

| | | | |
|---|---|---|---|
| 3,902,022 | 8/1975 | Breeden et al. | 179/2 EC |
| 4,172,969 | 10/1979 | Levine et al. | 179/2 EC |
| 4,178,476 | 12/1979 | Frost. | |
| 4,197,526 | 4/1980 | Levine et al. | 340/311 |
| 4,263,480 | 5/1981 | Levine | 179/2 EC |
| 4,313,035 | 1/1982 | Jordan et al. | 179/18 BE |
| 4,336,524 | 6/1982 | Levine | 340/311.1 |
| 4,337,376 | 6/1982 | Gruenberg. | |
| 4,455,651 | 6/1984 | Baran | 370/104 |
| 4,577,060 | 3/1986 | Webb et al. | 179/2 EC |

OTHER PUBLICATIONS

Lovell et al, "An Experiment to Enable Commercial Mobile Satellite Service", Conference Record, Nat. Telesystems Conf, 11/82, pp. B1.3.1-5.
Anderson et al, "Satellite-Aided Mobile Telephone System", Proc. of the Nat. Electr. Conf, vol. 33 (1979), pp. 432-437.
Parker, "Satellite Micro Earth Stations—A Small Investment with Big Returns", Data Communications, vol. 12 (1983) No. 1, pp. 97-104.

Primary Examiner—Robert Lev
Attorney, Agent, or Firm—Spencer & Frank

[57] ABSTRACT

A method for establishing a radio connection between a stationary subscriber terminal connected to a telephone system and a selected mobile subscriber terminal equipped with a transmit/receive device. A search request filed by the stationary subscriber terminal is transmitted to a satellite which broadcasts this search request over a given area of the earth. This search request contains the number of the selected mobile subscriber terminal and the number of the stationary subscriber terminal to be called back or the identification number of a radio transfer exchange with which the stationary subscriber terminal is connected and the circuit number of the connection existing between the radio transfer exchange and the stationary subscriber terminal.

12 Claims, 3 Drawing Figures

METHOD FOR ESTABLISHING A RADIO CONNECTION

BACKGROUND OF THE INVENTION

The present invention relates to a method for establishing a radio connection between a stationary subscriber terminal connected to a telephone system and a mobile subscriber terminal equipped with a transmit/receive device, with the telephone system being connected to a radio transfer exchange which can be reached by the stationary terminal in order to be supplied with a search request giving the number of the mobile subscriber whereupon the search request is transmitted.

For the case where the connection between the stationary subscriber terminal and the radio transfer exchange is initially interrupted after the search request has been transmitted and the stationary subscriber terminal must wait for a call-back from the mobile subscriber terminal, a connection is established between the transmit/receive device and the radio transfer exchange if the transmit/receive device of the desired mobile subscriber terminal has identified its own number, and the radio transfer exchange then switches the call through to the stationary subscriber terminal.

If, after dialing the stationary subscriber terminal, the connection with the radio transfer exchange is not interrupted, the search request, including the identification number for the dialed radio transfer exchange, is transmitted and the transmit/receive device of the desired mobile subscriber terminal, once it has identified its own number in the search request, sends the identification number of the radio transfer exchange which is connected to the stationary subscription and a connection is established with this radio transfer exchange.

Such a method is disclosed in DE-OS (German Laid-open Application) No. 2,228,327. The entire area covered by the system, in which the mobile subscriber terminal may be located, is here subdivided into a plurality of radio traffic regions, each having its own stationary radio station. To reach a mobile subscriber terminal whose momentary location is unknown to the stationary subscriber, the radio stations of all radio regions must be dialed and each radio station must emit a search signal for the mobile subscriber terminal.

SUMMARY OF THE INVENTION

It is now an object of the present invention to provide a method of the above-mentioned type which avoids the need for a plurality of radio regions and the resulting complicated search procedure for locating the mobile subscriber terminal.

If, after making a search request, the connection between the stationary subscriber terminal and the radio transfer exchange is initially interrupted until the mobile subscriber terminal calls back, the objects according to the invention are achieved by a method for establishing a radio connection between a stationary subscriber terminal connected to a telephone system having at least one radio transfer exchange and a selected mobile subscriber terminal equipped with a transmitting/receiving device, including the steps of: operating the stationary subscriber terminal to establish a connection with a selected radio transfer exchange and transmitting from the stationary subscriber terminal to the selected radio transfer exchange a search request including identification of the selected mobile subscriber terminal; transmitting the search request from the selected radio transfer exchange to the transmitting/receiving device of the selected mobile subscriber terminal; in response to receipt of the search request, effecting connection, by means of the transmitting/receiving device of the selected mobile subscriber terminal, between the selected mobile subscriber terminal and the radio transfer exchange with which the stationary subscriber terminal established a connection; and then connecting the selected mobile subscriber terminal to the stationary subscriber terminal, and in which, according to the invention: the search request includes identification of the stationary subscriber terminal; the step of transmitting from the radio transfer device comprises transmitting the search request from the radio transfer exchange via a radio ground station to a satellite and then broadcasting the search request from the satellite to a region on the ground in which the mobile subscriber terminal is located; the step of effecting connection includes transmitting identification of the stationary subscriber terminal to the radio transfer exchange; and the step of connecting is carried out by using the stationary subscriber terminal identification.

If the connection is not interrupted, the objects according to the invention are achieved by a method for establishing a radio connection between a stationary subscriber terminal connected to a telephone system having at least one radio transfer exchange and a selected mobile subscriber terminal equipped with a transmitting/receiving device, including the steps of: operating the stationary subscriber terminal to establish a connection with a selected radio transfer exchange and transmitting from the stationary subscriber terminal to the selected radio transfer exchange a search request including identification of the selected mobile subscriber terminal; modifying the search request transmitted from the stationary subscriber terminal to include identification of the selected radio transfer exchange; transmitting the modified search request from the selected radio transfer exchange to the transmitting/receiving device of the selected mobile subscriber terminal; in response to receipt of the modified search request, transmitting from the selected mobile subscriber terminal identification of the selected radio transfer exchange which is connected to the stationary subscriber terminal for establishing a connection with the selected radio and transfer exchange, and in which, according to the invention: the step of transmitting the modified search request comprises further modifying the search request to include identification of the specific connection between the stationary subscriber terminal and the selected radio transfer exchange, transmitting the further modified search request from the selected radio transfer exchange via a radio ground station to a satellite and then broadcasting the further modified search request from the satellite to a region on the ground in which the mobile subscriber terminal is located; and the step of transmitting from the selected mobile subscriber terminal comprises transmitting the identification of the specific connection so that the selected radio transfer exchange can connect the mobile subscriber terminal, with the aid of the identification of the specific connection, via the specific connection to the stationary subscriber terminal.

The use of a satellite makes it possible to operate with just a single radio traffic region since the satellite is able to broadcast the signal for the mobile subscriber over a very large area on the earth encompassing the entire system service area. Since, according to the present invention, only one radio traffic region exists, there results the advantage that fewer radio frequency bands are required, since otherwise each one of the many radio traffic regions would have to have its own associated frequency band.

The invention will be described in greater detail below with reference to embodiments which are illustrated in the drawings.

DESCRIPTION OF THE PREFERRED EMBODIMENTS

Figure 1:
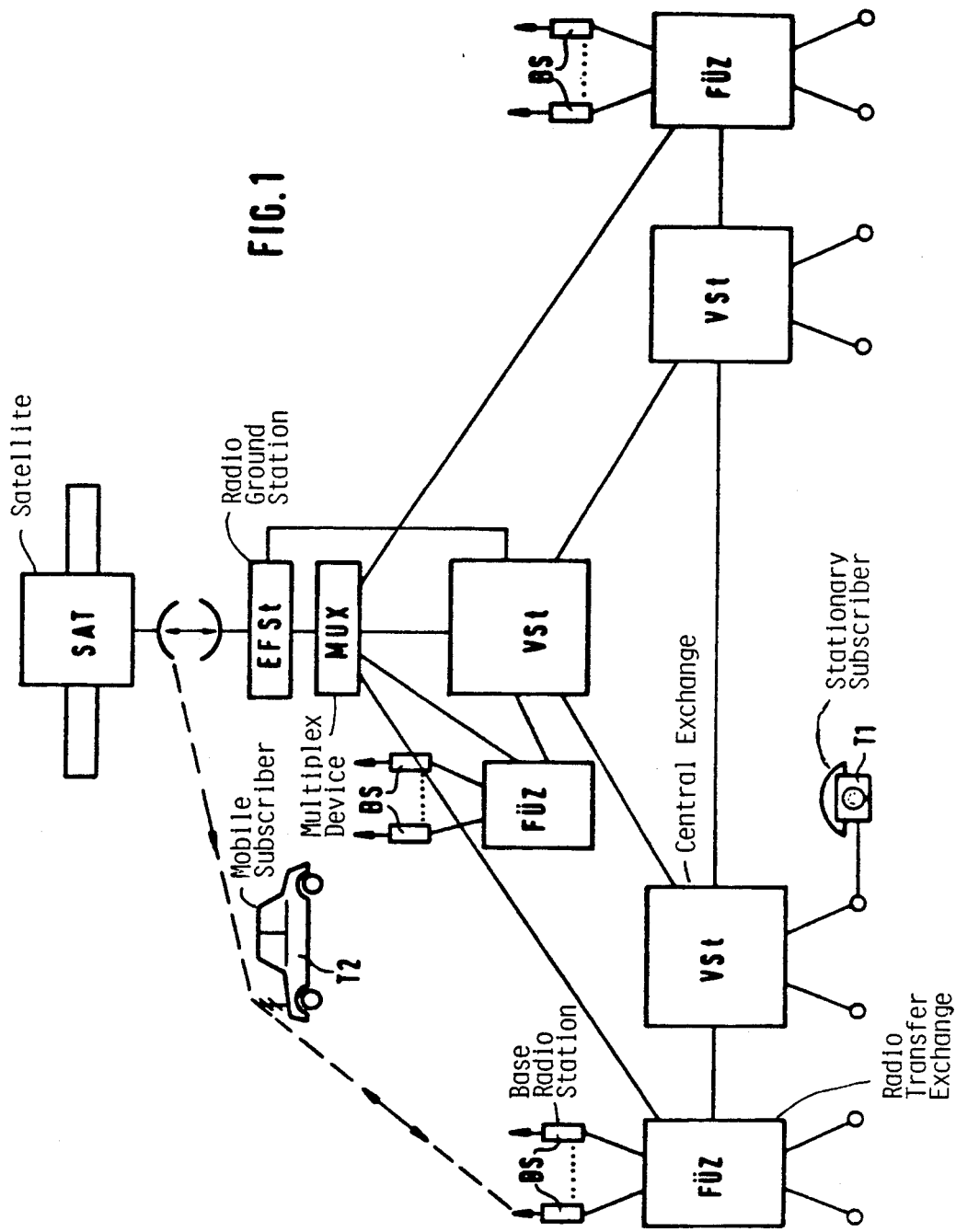
FIG. 1 is a schematic diagram of a system according to the invention for establishing a radio connection with only one radio ground station.

A system for establishing a radio connection between a stationary subscriber terminal T1 connected to a central exchange VSt of a telephone system and a mobile subscriber terminal T2 equipped with a transmit/receive device is shown in FIG. 1. In this system, the central exchanges VSt are connected with respective radio transfer exchanges FUZ, which themselves are all connected with a common multiplexing device MUX. The multiplexing device MUX transmits signals originating from exchanges FUZ, via a radio ground station EFSt, to a satellite SAT. Each exchange FUZ is equipped with a plurality of base stations BS distributed over the area serviced by that exchange.

The description below now relates to methods according to which a radio connection can be established, for example by means of the system shown in FIG. 1, between the stationary subscriber terminal T1 and the mobile subscriber terminal T2.

The user of stationary subscriber terminal T1 initially dials the number of the radio transfer exchange FUZ with which the desired mobile subscriber terminal T2 is registered and then he dials the number of the desired mobile subscriber terminal. As soon as a connection has been established between the stationary subscriber terminal and the dialed radio transfer exchange FUZ, a request is sent to the stationary terminal T1 to indicate the number to be called by the mobile subscriber terminal T2. Generally this will be the number of the calling stationary subscriber terminal itself or the number of another subscriber terminal. Once the number has been received by the radio transfer exchange FUZ, the user of the calling stationary subscriber terminal T1 is requested to hang up his telephone and wait for a callback from the desired mobile subscriber terminal T2.

Each one of the radio transfer exchanges FUZ arranges the search requests received from stationary subscriber terminals, i.e. requests including the number of the desired mobile subscriber terminal T2 and the number of the subscriber terminal T1 to be called back, in a call order list and transmits the search requests sequentially to multiplexing device MUX. Multiplexing device MUX combines the search requests into a bit stream and transmits the latter to radio ground station EFSt from where it is sent to the satellite SAT which then rebroadcasts the signals on a suitable frequency band over a given broadcast area on the ground.

If the transmit/receive device of the desired mobile subscriber terminal T2 identifies its own number in the search requests broadcast by the satellite, it stores the number of the stationary subscriber terminal T1 to be called, which follows the own number of terminal T2. After receiving the numbers, the transmit/receive device of mobile subscriber terminal T2 automatically transmits the number of the subscriber terminal T1 to be called back to that base radio station BS which offers the best receiving level in the closest radio transfer exchange FUZ. The mobile subscriber terminal T2 continues to be connected with this radio transfer exchange, which finally establishes the connection applicable to the number of the desired stationary subscriber terminal T1 in the telephone system, even after the mobile subscriber terminal moves into the receiving range of another radio transfer exchange. If a plurality of radio transfer exchanges participate in the establishment of such a radio connection, the necessary interchange of data among these exchanges can take place via the multiplexing device or even via the satellite SAT.

If—in deviation from the above-described method—the connection between the stationary subscriber terminal T1 and the radio transfer exchange is not to be interrupted after the search request has been transmitted to such radio transfer exchange, until the desired subscriber calls back, the following method must be used to establish the radio connection.

The user of stationary subscriber terminal T1 initially dials the radio transfer exchange FUZ with which the desired mobile subscriber terminal T2 is registered, giving the number of the desired mobile subscriber terminal T2. The radio transfer exchange FUZ then transmits this search request, supplemented by the identification number of the radio transfer exchange and the circuit number of the waiting connection with the stationary subscriber, to multiplexing device MUX. From there, the search request travels the path described above, via radio ground station EFSt and satellite SAT to the broadcast area on the ground in the region where mobile subscriber terminal T2 is located. If the transmit/receive device of the desired mobile subscriber terminal T2 has received the search request containing its number, the identification number of the radio transfer exchange FUZ with which stationary subscriber terminal T1 is connected and the circuit number of the connection, it automatically transmits the identification number and the circuit number to that base radio station BS which has the best receiving level in the closest radio transfer exchange.

Once a switch has been made to the radio transfer exchange FUZ with which stationary subscriber terminal T1 is connected, the circuit number of the waiting connection is transmitted together with a special identification so that a switch can finally be made to the circuit of stationary subscriber terminal T1. The special identification of the circuit number is added to distinguish it from a sequence of dial numbers transmitted by a mobile subscriber terminal if the latter terminal initiates a radio connection with another subscriber terminal.

To assure that the desired mobile subscriber terminal T2 receives the search request, satellite SAT should transmit repeatedly at short time intervals.

Figure 2:
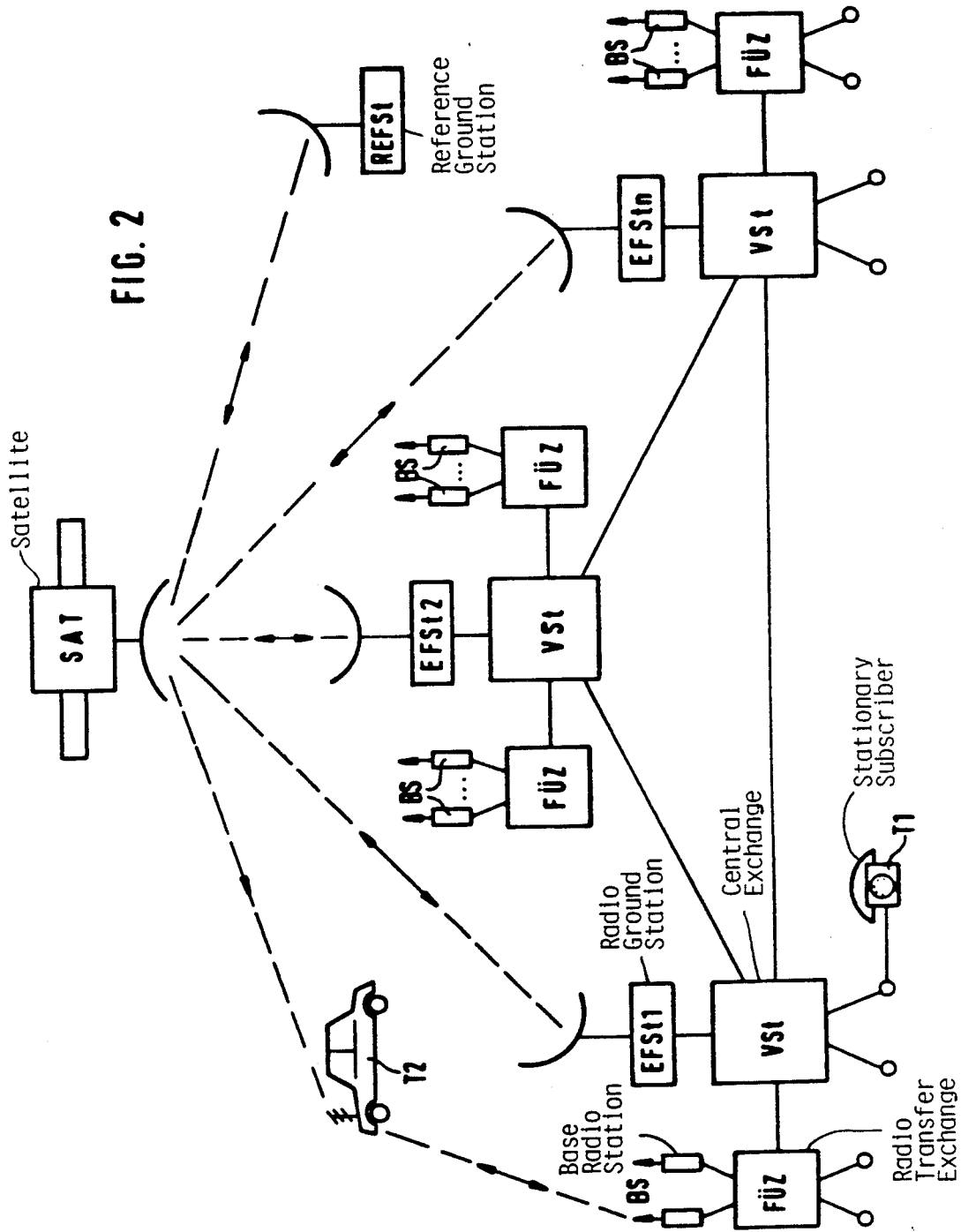
FIG. 2 is a diagram similar to that of FIG. 1, showing a system according to the invention including a plurality of radio ground stations.

Instead of carrying the traffic between the radio transfer exchanges FUZ and satellite SAT over a multiplexing device MUX, as shown in FIG. 1, a plurality of radio ground stations EFSt1 ... EFStn and a reference ground station REFSt operating in time multiplex with multiple access (TDMA) can also be used as shown by the system of FIG. 2.

Figure 3:
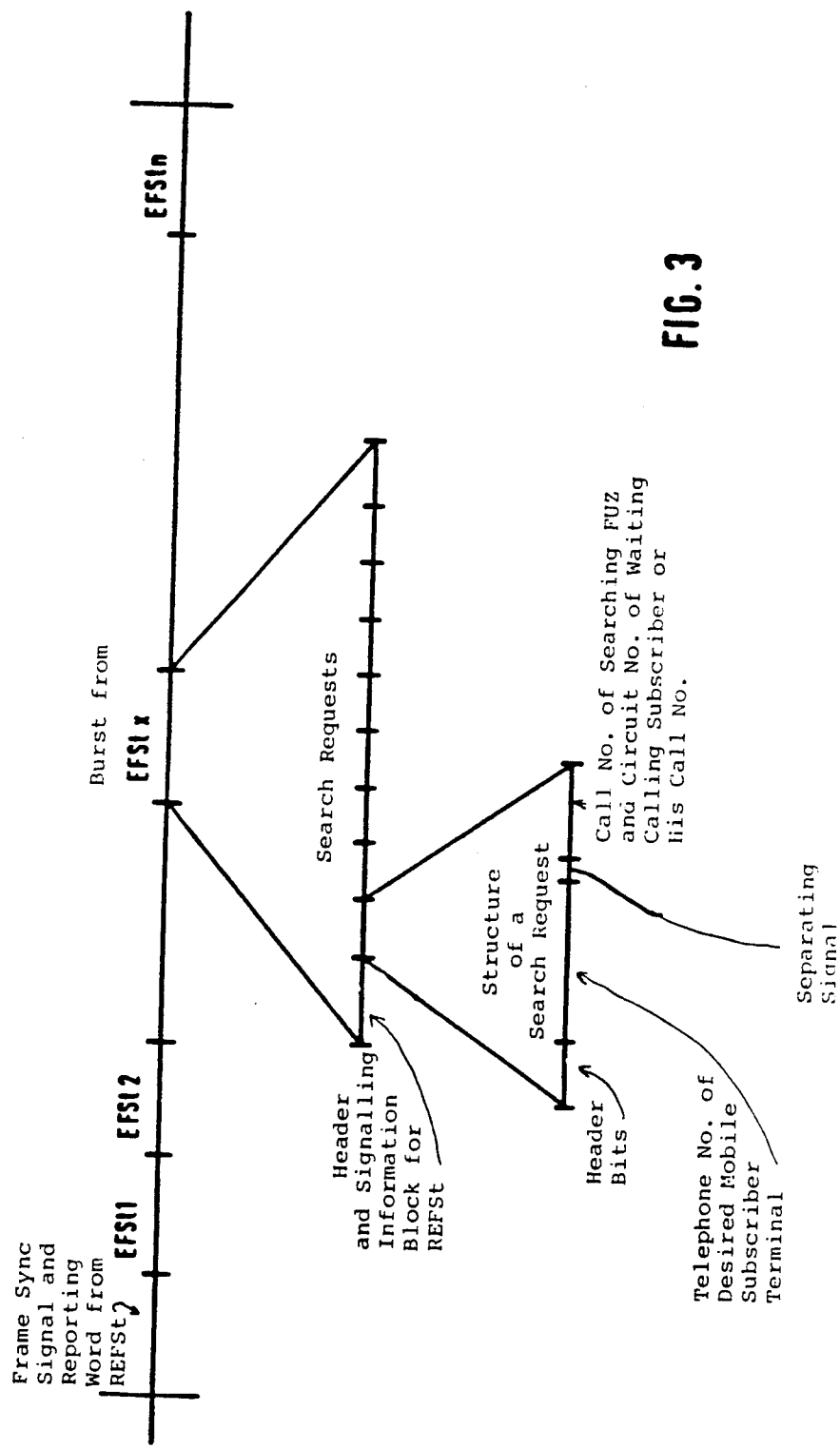
FIG. 3 is a signal timing diagram showing the frame structure for search requests in the system of FIG. 2.

FIG. 3 shows a frame structure that can be applied for TDMA operation in radio ground stations EFSt1 ... EFStn if the search requests are transmitted in the form of pulse bundles, or bursts.

The frame begins with a frame synchronizing signal and a reporting word transmitted by reference ground station REFSt. This reference ground station REFSt takes care of synchronizing the entire system, monitoring the transmission capacity of the individual radio ground stations EFSt and administering and operating the system. Reference ground station REFSt uses the frame synchronizing signal to transmit instructions and information to the radio ground stations EFSt, which, for this purpose, receive the entire frame as well. The frame synchronizing signal and the reporting word are followed by individual bursts from radio ground stations EFSt1 ... EFStn, in succession.

Each burst again begins with a header block and a signalling information block. The latter is provided with information which is to be transmitted to the reference ground station REFSt. This information includes data regarding the operating state of each radio ground station and reports relating to the requirements of the respective ground station for transmission capacity, i.e. whether the radio ground stations should be given the capacity to handle more or less search requests in a burst. The search requests themselves contain, in addition to several header bits to delimit them from preceding search requests, the number of the desired mobile subscriber terminal and, separated by way of a separating word, the identification number of the searching radio transfer exchange and the circuit number of the waiting, calling subscriber terminal or its telephone number.

A mobile subscriber terminal can of course also take the place of the above-discussed stationary subscriber terminal if the user of a mobile terminal wants to communicate with another mobile subscriber terminal. In this case, a search request would be broadcast from the calling mobile subscriber terminal to a radio transfer exchange. From there, the same process would take place for the establishment of a radio connection with the desired mobile subscriber terminal as if the requesting subscriber terminal were a stationary subscriber terminal.

If suitable conference devices are used, it would also be possible to establish conference connections between a plurality of stationary and mobile subscriber terminals.

The present invention can be readily implemented by suitably linking existing telephone systems having mobile phone capability with existing communication satellite systems.

It will be understood that the above description of the present invention is susceptible to various modifications, changes and adaptations, and the same are intended to be comprehended within the meaning and range of equivalents of the appended claims.

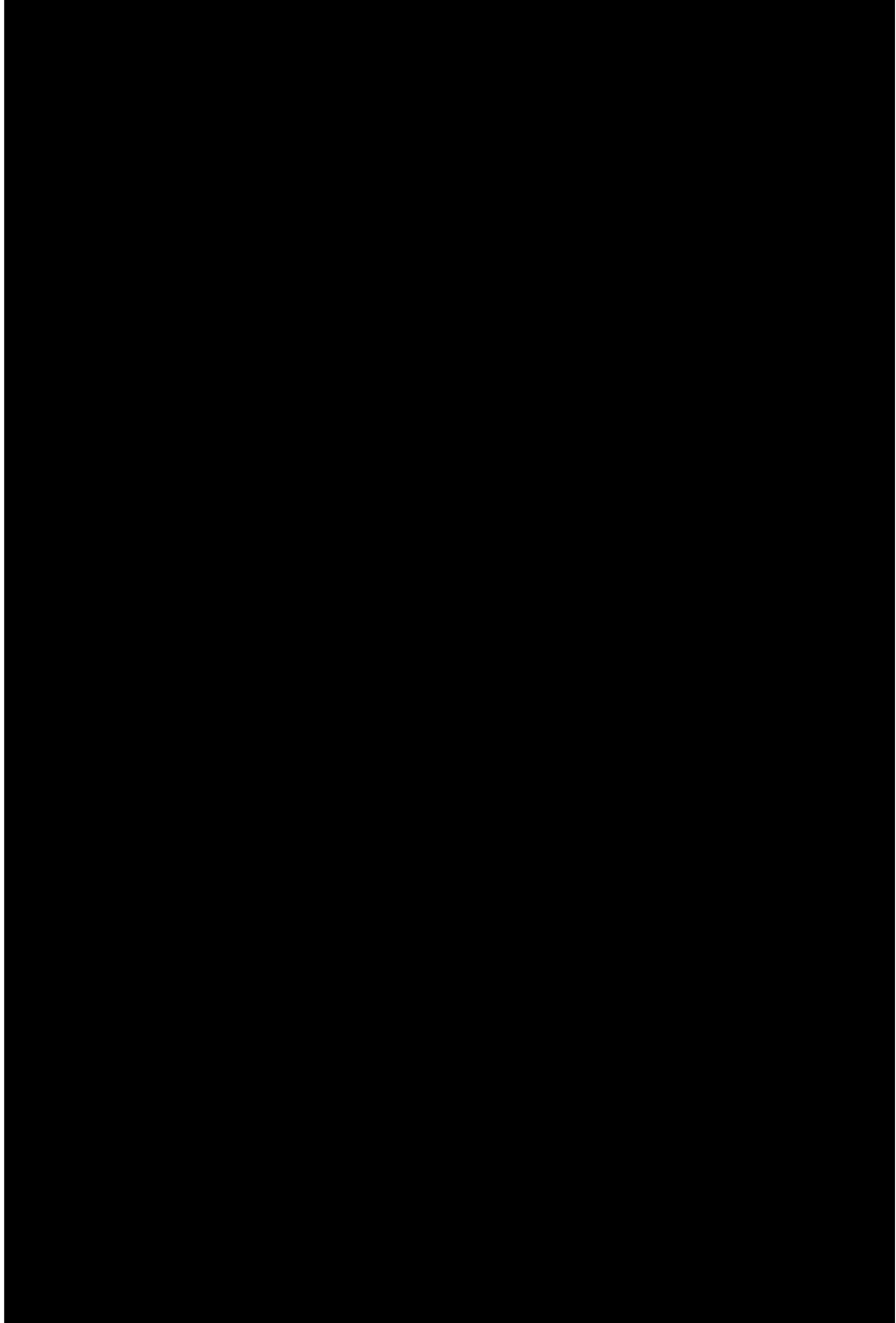

What is claimed is:

1. In a method for establishing a radio connection between a stationary subscriber terminal connected to a telephone system having at least one radio transfer exchange and a selected mobile subscriber terminal equipped with a transmitting/receiving device, including the steps of: operating the stationary subscriber terminal to establish a connection with a selected radio transfer exchange and transmitting from the stationary subscriber terminal to the selected radio transfer exchange a search request including identification of the selected mobile subscriber terminal; transmitting the search request from the selected radio transfer exchange to the transmitting/receiving device of the selected mobile subscriber terminal; in response to receipt of the search request, effecting connection, by means of the transmitting/receiving device of the selected mobile subscriber terminal, between the selected mobile subscriber terminal and the radio transfer exchange with which the stationary subscriber terminal established a connection; and then connecting the selected mobile subscriber terminal to the stationary subscriber terminal; the improvement wherein: the search request includes identification of the stationary subscriber terminal; said step of transmitting from the radio transfer exchange comprises transmitting the search request from the radio transfer exchange via a radio ground station to a satellite and then broadcasting the search request from the satellite to a region on the ground in which the mobile subscriber terminal is located; said step of effecting connection includes transmitting identification of the stationary subscriber terminal to the radio transfer exchange; and said step of connecting is carried out, solely via a terrestrial radio system and telephone network, by using the stationary subscriber terminal identification.

2. Method as defined in claim 1 wherein a plurality of search requests are transmitted from a plurality of stationary subscriber terminals within a given time interval, and said step of transmitting from the radio transfer exchange comprises effecting a multiplex transmission of the plurality of search requests.

3. Method as defined in claim 1 wherein said step of broadcasting comprises broadcasting the search request repeatedly at short time intervals.

4. Method as defined in claim 1 wherein the telephone system has a plurality of radio transfer exchanges, said step of effecting connection is carried out with the radio transfer exchange closest to the selected mobile subscriber terminal, and said step of connecting is carried out by connecting the radio transfer exchange closest to the selected mobile subscriber terminal to the selected radio transfer exchange.

5. Method as defined in claim 4 wherein the connection between different radio transfer exchanges is carried out via a multiplexing device.

6. Method as defined in claim 4 wherein the connection between different radio transfer exchanges is via the satellite.

7. In a method for establishing a radio connection between a stationary subscriber terminal connected to a telephone system having at least one radio transfer exchange and a selected mobile subscriber terminal equipped with a transmitting/receiving device, including the steps of: operating the stationary subscriber terminal to establish a connection with a selected radio transfer exchange and transmitting from the stationary subscriber terminal to the selected radio transfer exchange a search request including identification of the selected mobile subscriber terminal; modifying the search request transmitted from the stationary sub-